UNITED STATES PATENT OFFICE.

WADE W. BAKER, OF LONDON, OHIO.

COMPOSITION OF MATTER FOR PLASTER AND SIMILAR MATERIALS.

1,081,565.     Specification of Letters Patent.     Patented Dec. 16, 1913.

No Drawing.     Application filed September 18, 1912. Serial No. 720,966.

*To all whom it may concern:*

Be it known that I, WADE W. BAKER, a citizen of the United States, residing at London, in the county of Madison and State of Ohio, have invented certain new and useful Improvements in Compositions of Matter for Plaster and Similar Material, of which the following is a specification.

My invention relates to an improvement in the production of wall plaster or other similar compositions of matter, in which the combination of ingredients is converted into a plastic mass and then permitted to dry and harden to produce a comparatively solid body.

The objects of my invention are to combine with a composition of the character set forth an element or ingredient which will tend to absorb and hold for a desirable time moisture which is the result of converting the combined ingredients into a plastic mass; to combine with the usual ingredients of plaster or similar compositions an ingredient which will not only serve as a moisture absorbing binder for the remaining elements of the composition, but which will add strength to the composition and obviate the tendency of an undesirable rapid drying of the mass and to produce other improvements in compositions of this character which will be more fully pointed out hereinafter.

Although it will be obvious that the absorbent and binding ingredient which I employ may be utilized not only in the production of wall plasters, but in similar mixtures which comprise combinations of cement with other ingredients, I will first refer to its employment in connection with wall plaster.

Heretofore, it has been common to produce wall plasters of various well known ingredients such as finely ground gypsum rock, lime, sand, hair and other materials. Certain of these materials have also been combined with wood fiber to produce what is known as a fiber plaster. In carrying out my invention, I propose to combine with any well known ordinary plaster mixture an element consisting of leather which is ground to a granular state and thoroughly mixed with one or more other well known wall plaster ingredients. The per cent. of leather to the composition thus formed may vary in accordance with the requirements of the plaster from 2½ to 5% of the body of the plaster. This mixture of ingredients while in its dry state, may be stored in suitable sacks or other containers and kept in desirable condition for any reasonable length of time before it is converted into a plastic state for use. It will be found that while the material is in this preliminary or dry state, such dampness as might be absorbed by the material from the atmosphere or otherwise, will be taken up by the particles of leather contained in the mixture and the gypsum, lime or other material will thus be prevented from becoming lumpy, which heretofore has resulted from the action of the moisture. When the material is ready for use, a sufficient amount of water is thoroughly mingled therewith to reduce the composition to a plastic mass of a desired consistency for use on a wall or other structure.

Heretofore in the application of ordinary wall plasters to building lath, it has been necessary to apply the material and finish the work with comparative rapidity in order to prevent the undesirable results of the rapid and ununiform drying or setting of the material. This has been a serious objection to ordinary wall plasters, for the reason that such ununiform and rapid setting of the material results in an ununiform contraction of the same and as a consequence unequal shrinkage of the material takes place, which produces cracks in the face of the wall. The leather introduced into the mixture as described, has a tendency to absorb moisture from the remaining ingredients and owing to the fact that the comparatively small particles of leather are thoroughly intermingled with the other ingredients, it will be understood that this absorption will be uniform throughout the wall of plaster.

It is well known that leather is not possessed of quick drying qualities and it will, therefore, be understood that the body of the wall of plaster will retain the moisture a sufficient time to permit of a comparatively slow and uniform drying of the material which will obviate the tendency of the plaster to crack from too rapid drying or setting. It has been found, also, that a mixture such as set forth, produces a desirable wall covering for the further reason that it renders the wall, to a desirable degree, sound proof. Another difficulty which is overcome by my improved composition, lies in the fact that ordinary wood building lath when subjected to the action of damp plaster, becomes so thoroughly dampened as to produce a swelling of the lath, which, as the wall dries out, shrinks away from the plaster and loses its efficiency as an anchor for the plaster to the framework or wall body. By the use of the leather ingredient, a greater per cent. of this moisture is absorbed by the leather and the difficulty referred to is thereby largely overcome.

It will readily be understood that the introduction of leather in a composition of this character may be accomplished at a comparatively small expense, as refuse leather may be employed For the reason that the ground or finely separated leather may be utilized as an absorbent and binder ingredient for cement mixtures designed for the production of various structures, such for instance as building materials, railway ties, etc., I do not desire to limit myself to the use of this ingredient in combination with certain specified ingredients of plastic masses.

What I claim, is:

A wall plaster comprising a quick drying base of gypsum rock, sand and water, in combination with a combined binder and retarder consisting of comminuted leather said leather possessing marked moisture absorbent and retaining qualities, the retention of moisture by said leather retarding the drying of the mass, substantially as described.

In testimony whereof I affix my signature in presence of two witnesses.

WADE W. BAKER.

Witnesses:
A. S. BECKWITH,
INA TENNEY FOSTER.

Copies of this patent may be obtained for five cents each, by addressing the " Commissioner of Patents, Washington, D. C."